(12) United States Patent
Sun et al.

(10) Patent No.: US 11,277,249 B2
(45) Date of Patent: Mar. 15, 2022

(54) INGRESS DETECTION

(71) Applicant: Cable Television Laboratories, Inc., Louisville, CO (US)

(72) Inventors: Ruoyu Sun, Louisville, CO (US); Hsinchih Lin, Louisville, CO (US); Mark J. Poletti, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 43 days.

(21) Appl. No.: 16/574,785

(22) Filed: Sep. 18, 2019

(65) Prior Publication Data

US 2020/0092071 A1 Mar. 19, 2020

Related U.S. Application Data

(60) Provisional application No. 62/732,895, filed on Sep. 18, 2018, provisional application No. 62/793,021, filed on Jan. 16, 2019, provisional application No. 62/844,818, filed on May 8, 2019.

(51) Int. Cl.
*H04L 5/00* (2006.01)
*H04W 72/08* (2009.01)

(52) U.S. Cl.
CPC ............ *H04L 5/0062* (2013.01); *H04L 5/006* (2013.01); *H04W 72/082* (2013.01)

(58) Field of Classification Search
CPC ..... H04L 5/006; H04L 5/0062; H04W 72/082
USPC ......................................................... 370/329
See application file for complete search history.

(56) References Cited

U.S. PATENT DOCUMENTS

| 7,885,631 | B2* | 2/2011 | Yang ..................... | H04B 1/1027 455/312 |
| 2009/0110087 | A1* | 4/2009 | Liu ......................... | H04L 5/0094 375/260 |
| 2012/0135780 | A1* | 5/2012 | Sun ........................ | H04W 52/12 455/522 |
| 2016/0233980 | A1* | 8/2016 | Pantelias ................ | H04L 1/0041 |
| 2020/0275503 | A1* | 8/2020 | Yang ................. | H04W 72/0453 |

\* cited by examiner

*Primary Examiner* — Gbemileke J Onamuti
(74) *Attorney, Agent, or Firm* — Great Lakes Intellectual Property, PLLC

(57) ABSTRACT

An assessment tool for assessing signaling ingress and small cell placement within a communication network is contemplated. The assessment tool may include capability sufficient for assessing signaling ingress associated with radio frequency (RF) signaling attenuating, influencing or otherwise interfering with other signaling being transmitted over a communication network.

17 Claims, 17 Drawing Sheets

| Frequency Band (MHz) | LTE Band | LTE Downlink Frequency (MHz) | | | LTE Uplink Frequency (MHz) | | | Mode | Geographical Area |
|---|---|---|---|---|---|---|---|---|---|
| | | Low | Middle | High | Low | Middle | High | | |
| 400 | 73 | 460 | 462.5 | 465 | 450 | 452.5 | 455 | FDD | Asia and Pacific |
| | 72 | 461 | 463.5 | 466 | 451 | 453.5 | 456 | FDD | Europe Middle East and Africa |
| | 31 | 462.5 | 465 | 467.5 | 452.5 | 455 | 457.5 | FDD | Global |
| 600 | 71 | 617 | 634.5 | 652 | | 680.5 | 698 | | North America |
| | 44 | 703 | 753 | 803 | 703 | 753 | 803 | TDD | Asia and Pacific |
| | 68 | 753 | 768 | 783 | 698 | 713 | 728 | FDD | Europe Middle East and Africa |
| | 29 | 717 | 722.5 | 728 | Downlink only | | | | North America |
| | 85 | 728 | 737 | 746 | 698 | 707 | 716 | FDD | North America |
| 700 | 12 | 729 | 737.5 | 746 | 699 | 707.5 | 716 | FDD | North America |
| | 28 | 758 | 780.5 | 803 | 703 | 725.5 | 748 | FDD | Europe, Asia and Pacific |
| | 67 | 738 | 748 | 758 | Downlink only | | | | Europe Middle East and Africa |
| | 17 | 734 | 740 | 746 | 704 | 710 | 716 | FDD | North America |
| | 13 | 746 | 751 | 756 | 777 | 782 | 787 | FDD | North America |
| | 14 | 758 | 763 | 768 | 788 | 793 | 798 | FDD | North America |
| | 27 | 852 | 860.5 | 869 | 807 | 815.5 | 824 | FDD | North America |
| | 26 | 859 | 876.5 | 894 | 814 | 831.5 | 849 | FDD | North America |
| 800 | 18 | 860 | 867.5 | 875 | 815 | 822.5 | 830 | FDD | Japan |
| | 5 | 869 | 881.5 | 894 | 824 | 836.5 | 849 | FDD | North America |
| | 6 | 875 | 880 | 885 | 830 | 835 | 840 | FDD | Asia and Pacific |
| | 19 | 875 | 882.5 | 890 | 830 | 837.5 | 845 | FDD | Japan |
| | 20 | 791 | 806 | 821 | 832 | 847 | 862 | FDD | Europe Middle East and Africa |
| 900 | 8 | 925 | 942.5 | 960 | 880 | 897.5 | 915 | FDD | Global |

Fig. 3

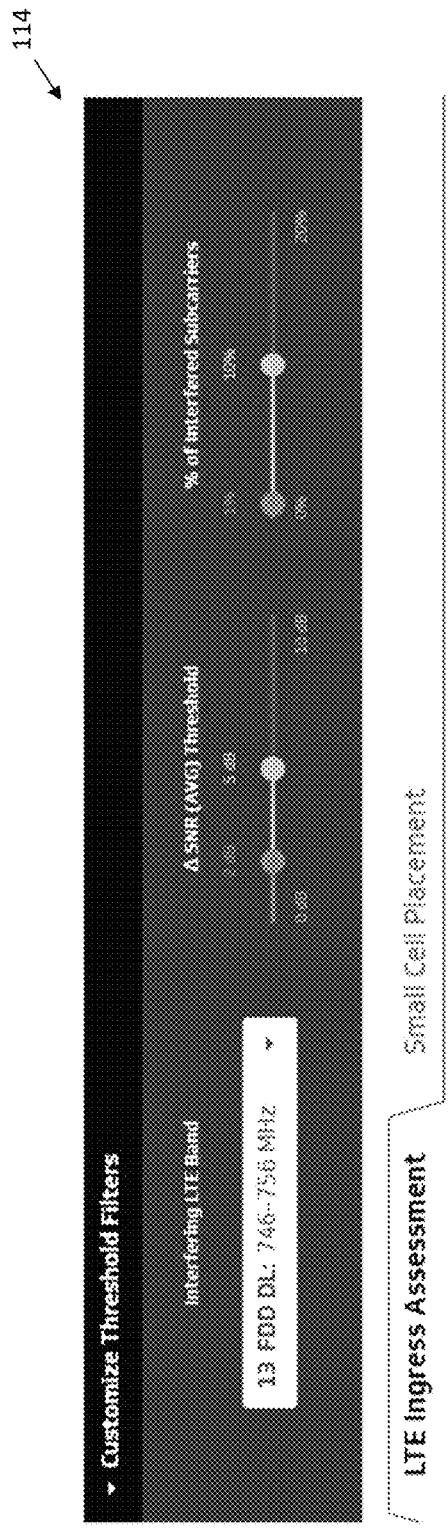
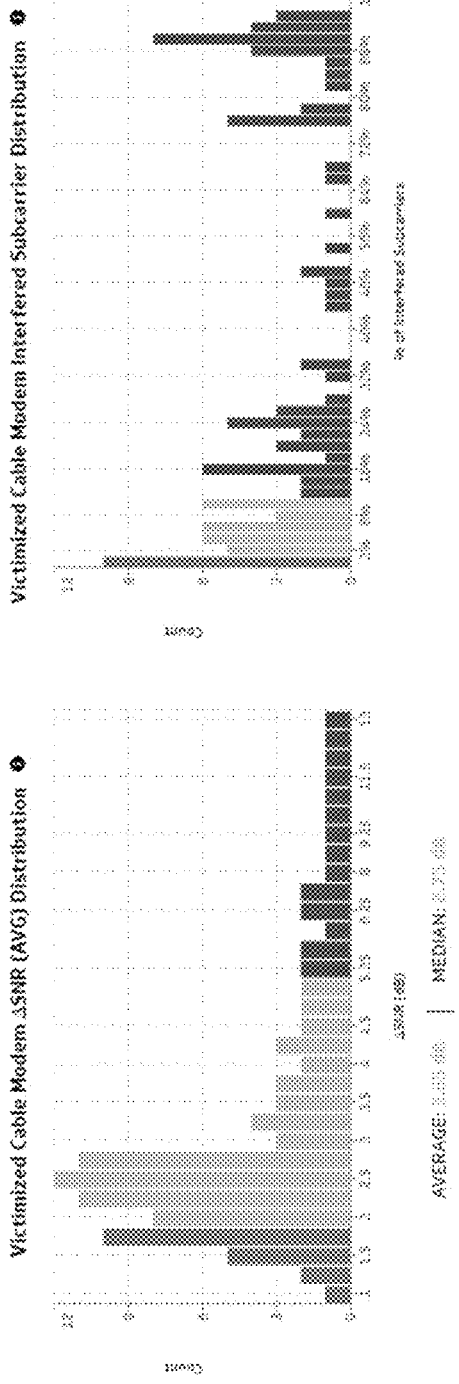
Fig. 14

INGRESS DETECTION

CROSS-REFERENCE TO RELATED APPLICATIONS

This application claims the benefit of U.S. provisional application No. 62/732,895 filed Sep. 18, 2018, U.S. provisional application No. 62/793,021 filed Jan. 16, 2019 and U.S. provisional application No. 62/844,818 filed May 8, 2019, the disclosures of which are incorporated in their entireties by reference herein.

TECHNICAL FIELD

The present invention relates to assessing signaling ingress within a communication network, such as but not necessarily limited to assessing signaling ingress associated with radio frequency (RF) signaling attenuating, influencing or otherwise interfering with other signaling being transmitted over a communication network.

BACKGROUND

Cable plants and other communication networks can suffer interference from external or over-the-air sources of radio frequency (RF) signaling when the associated energy couples into "exposed" parts of the network, such as when RF signaling associated with mobile or Long-Term Evolution (LTE) networks, radio and TV ingress through loose connectors, cracks, corroded cables and other similar forms. The related ingress of RF signaling, which may be referred to as ingress, can impair service delivery and customer experience by causing lower data rates, freezing pictures, blank screens, loss of service, pixelation and similar experiences. A fair amount of RF interference can come from mobile or LTE networks due to the networks associated with cable and mobile operators periodically sharing the same spectrum at the same time over different mediums, i.e., a cable network or other wired network may utilize a different medium for signaling versus a wireless or over-the-air network but both of the cable and mobile networks may simultaneously carry signaling at overlapping or common frequencies.

In the U.S., for example, mobile LTE networks operate in the 600-900 MHz band, which in the case of a cable network operating according to a Data Over Cable Service Interface Specification (DOCSIS), can result in approximately 215 MHz out of the 300 MHz, or 70%, of the available spectrum being overlapped, i.e., the LTE signaling can overlap with 70% of the cable signaling. This overlap can translate to 36 of the channels defined in the DOCSIS 3.0 specification being overlapped and 8,600 of the sub-carriers defined in the DOCSIS 3.1 specification being overlapped. This type of relatively large spectrum overlap can increase the chances of LTE mobile networks interfering with signaling carried over a cable network depending on the condition of the associated medium. Assessing or otherwise quantifying the level of ingress or interference within cable network or other network suffering interference from outside, RF signaling, can be problematic due to difficulties and/or costs associated with actively measuring interference along physical portions the network due to such networks typically being too large for technicians to actively engage with an entirety of the network.

One non-limiting aspect of the present invention contemplates assessing ingress or other signaling interference within a cable plant or other similar network resulting from outside, RF signaling in a passive and/or non-intrusive manner by using measurements obtained from devices deployed in the network, such as in the case of a cable network using cable modem (CM) measurements collected by a cable modem termination system (CMTS). One non-limiting aspect of the present invention contemplates utilizing the ingress assessment techniques to facilitate identifying areas of ingress requiring correction and/or to facilitate identifying areas or locations where the lack of ingress may be sufficient to permit small cell or other sources of RF interference to be located.

BRIEF DESCRIPTION OF THE DRAWINGS

FIG. 3 illustrates a table of LTE bands selectable in accordance with the present invention to facilitate ingress detection.

FIGS. 13 and 14 respectively illustrate histograms contemplated in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
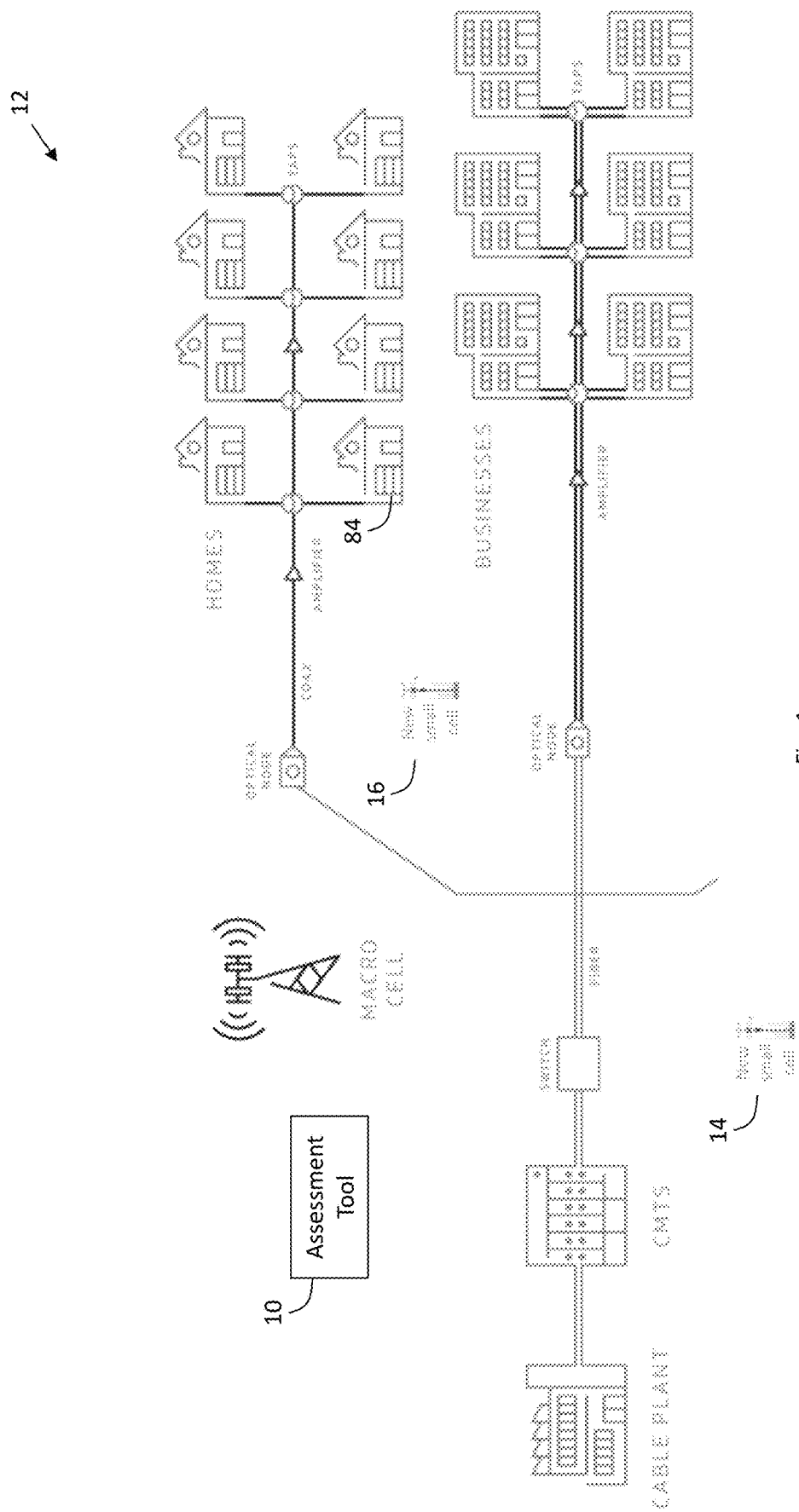
FIG. 1 illustrates an assessment tool in accordance with one non-limiting aspect of the present invention.

FIG. 1 illustrates an assessment tool 10 for assessing an influence of ingress or other signaling on a communication system 12 in accordance with one non-limiting aspect of the present invention. The present invention contemplates its use and application with any suitable communication system 12 operable with the processes and operations described herein and is predominately described for exemplary, non-limiting purposes with respect to the communication system 12 being a cable plant, such as one operating in accordance with Data Over Cable Service Interface Specification (DOCSIS) 3.1 series of provisions, including a cable plant operating in accordance with the DOCSIS Physical Layer Specification, CM-SP-PHYv3.1-I16-190121, released by Cable Television Laboratories, Inc. on Jan. 21, 2019, the disclosure of which is hereby incorporated by reference in its entirety herein. The cable plant 12 may be a desirable location for 4G LTE and 5G small cells 14, 16 to be placed due to the cable plant 12 optionally providing high-speed data backhaul over its wired mediums and/or mounting infrastructure for cell support. A small cell 14, 16 in the wrong location can undesirably leak RF interference into the cable plant 12 through various points of ingress and lead to degraded service. Potential points of ingress may include a cable modem (home), tap, amplifier, coaxial cable or anywhere in a line/trunk after an optical node or other location where signaling susceptible to over-the-air or other RF signaling may exist.

The assessment tool 10 contemplated by the present invention may be utilized to address the concerns associated with ingress, particularly LTE ingress, i.e., signaling within the LTE spectrum. The assessment tool 10 may be configured to facilitate predicting the RF interference and ingress based on small cell location relative to a cable plant's possible points of ingress. The assessment tool 10 may determine areas having low risk of RF interference to be deemed suitable locations for small cell placement using an analysis performed as a function of minimum signal-to-noise ratio (SNR) values determined for different levels of desired throughput (quadrature amplitude modulation (QAM)) whereby RF interference from a nearby small cell 14, 16 may be assessed as acceptable if low enough to avoid exceeding a minimum SNR. The assessment tool 10 capabilities for predicting small cell placement may be based on an LTE ingress detection algorithm sufficient to determine a minimum distance for small cell placement that ensures the minimum SNR is not affected by RF interference. FIG. 1 exemplarily illustrates predicted small cell locations 14, 16 based on a cable modem with varying shielding strengths as the point of ingress such that, if shielding is low (e.g., 0 dB) and leakage is high, then the small cell would need to be placed far from the device at a first location 14, and if shielding is high (e.g., 40-50 dB) and leakage is low, then the small cell can be placed closer to the device at a second location 16.

The assessment tool 10 contemplated by the present invention is believed to be particularly advantageous in use with DOCSIS 3.1 technology due to DOCSIS 3.1 relying upon orthogonal frequency division multiplexing (OFDM) with subcarrier spacing of 25 or 50 kHz, which results in many more channels/subcarriers requiring assessment than if the cable plant operated according to DOCSIS 3.0 due to DOCSIS 3.0 being limited to a few channels overlapping with LTE signaling (e.g., channels 116 and 117). The downstream band range in DOCSIS 3.1 is 108 MHz to 1.218 GHz, and each cable modem may be allocated 24-192 MHz, such that at maximum bandwidth (192 MHz) the maximum numbers of active subcarriers are 7,600 (25-kHz spacing) and 3,800 (50-kHz spacing). One non-limiting aspect of the present invention describes the assessment tool 10 facilitating a passive and non-intrusive methodology for assessing ingress using cable modem (CM) measurements collected by a cable modem termination system (CMTS) and stored in a cable operator's data analytics server or at the assessment tool 10. One technique leverages modulation error rate (MER) data per subcarrier and compares subcarriers with and without interference so as to provide information on the frequency, intensity and location of LTE ingress in the network 12. These results can be used by operations teams to troubleshoot and identify areas of LTE ingress, optionally down to a single CM or home, and to predict small cell placement onto a cable plant 12.

The CMTS and CMs can measure network conditions and report related proactive network maintenance (PNM) data to a data analytics server associated with the assessment tool 10. The network conditions can include the downstream receive modulation error ratio (RxMER), downstream received power, downstream forward error correction (FEC) statistics, downstream channel estimate coefficients and downstream constellation display, which may optionally correspond with and be obtained according to processes related to those described in U.S. application Ser. Nos. 15/951,971 and 15/951,978, the disclosures of which are hereby incorporated by reference in their entireties herein. The capabilities of the assessment tool 10 to rely upon PNM data or other measurements performed by CMs, CMTSs or other devices in the cable plant 12 may be beneficial in identifying the location, frequency and intensity of interference and ingress and thereby mitigate it and improve service delivery. While the present invention predominately describes its use and application with respect to the cable plant 12, e.g., that the PNM data collected from cable devices, the present eventually fully contemplates its use and application in detecting non-LTE sources of RF interference as well as "egress" leakage, such as to facilitate egress leakage in support of Federal Communications Commission (FCC) compliance.

Figure 2:
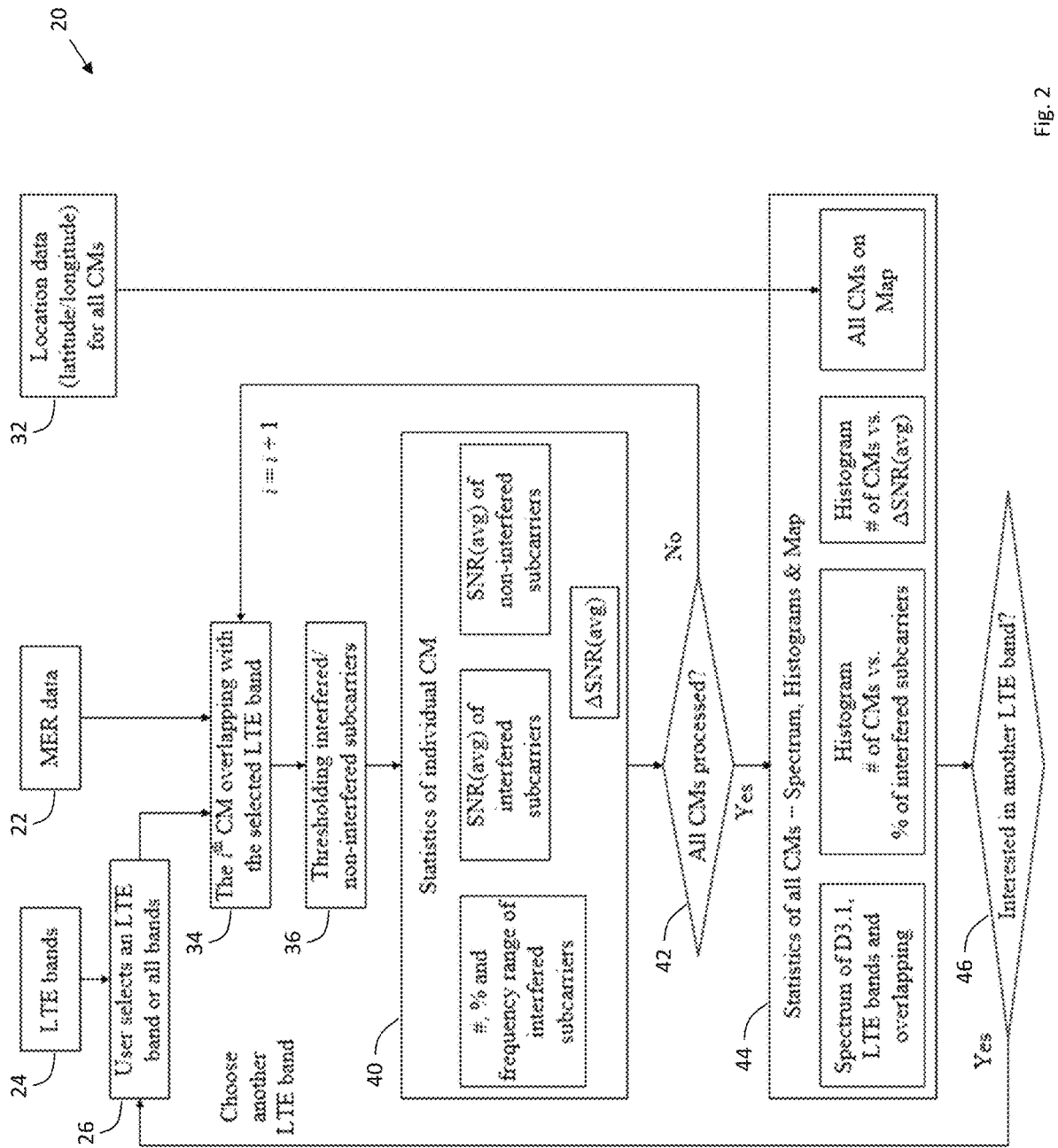
FIG. 2 illustrates a flowchart of a method for ingress detection in accordance with one non-limiting aspect of the present invention.

FIG. 2 illustrates a flowchart 20 of a method for ingress detection in accordance with one non-limiting aspect of the present invention. The method is predominantly described with respect to facilitating ingress assessment for a cable plant for exemplary non-limiting purposes as the present invention fully contemplates its use and application in other ingress assessments. The method may be facilitated with the assessment tool 10 or other construct having a processor and a non-transitory computer-readable medium whereby a corresponding plurality of instructions stored on the medium may be executed with the processor to facilitate the various processes and operations contemplated herein for ingress assessment. The non-transitory instructions may include executable code or other information sufficient for operating the assessment tool 10 to exchange messaging with devices within the cable plant, including capabilities sufficient to facilitate issuing related instructions or otherwise manipulating operations of the devices. The assessment tool 10 may optionally provide a web-based implement capable of executing related algorithms and analytics sufficient for enabling the processes described herein in addition to a dashboard or other interface sufficient to facilitate interfacing the resulting data and conclusions with a user.

A modulation error ratio (MER) data process 22 may correspond with obtaining the PNM data, metrics or other values being collected from the cable plant devices for purposes of facilitating the analytics contemplated herein for ingress assessment. One non-limiting aspect of the present invention contemplates relying upon the CMTS and/or the CMs to report PNM data on a regular or commanded basis for purposes of facilitating ingress assessment. The corresponding data may be sufficient to generate location dependent information at different portions of the cable plant, e.g., at the locations of the various CMs, optionally in a passive manner whereby the reporting devices submit the data according to compliance with corresponding specifications. In this manner, the data may be reported automatically or in response to requests from the assessment tool 10 without requiring a technician or other active, physical interaction with the associated part of the cable plant 12. The capabilities of the present invention to assess ingress using deployed devices in this manner, and at virtually any location within the cable plant 12 having devices capable of reporting the contemplated metrics, may be beneficial in providing a cost-effective, non-intrusive method for ingress assessment.

An LTE bands process 24 may correspond with identifying the LTE bands or other wireless frequency/spectrum to be assessed with respect to influencing ingress to the cable plant 12. A selection process 26 may be included for a user to select a particular LTE band desired for analysis or to implement assessment of multiple LTE bands, such as by assessing all available LTE bands available within a particular geographical area. FIG. 3 illustrates a table of LTE bands selectable in accordance with the present invention to facilitate ingress detection. FIG. 3 illustrates an LTE table 30 for an exemplary set of LTE bands capable of being assessed according to related geographical areas of use and other related information, such as to facilitate user selection of the LTE bands according to the location of the devices reporting the MER data. A location data process 32 may correspond with obtaining locational data, such as GPS coordinates, latitude and longitude or other designations sufficient for identify locations within the cable plant 12 for the devices reporting the data for processing, i.e., the location of the reporting CMs. The location data process 32 may automatically obtain location data for the CMs identified within the geographical area associated with the LTE band selection 24 and/or according to other geographical constraints, e.g., a particular trunk or section of the cable plant 12. The location data process 32 may be beneficial in limiting the ingress assessment related analytics to data collected from CMs or other cable plant devices within a selectable geographical area so as to provide granularity in the particular section or portion of the cable plant being analyzed for ingress.

A CM selection process 34 may correspond with commencing ingress assessment relative to a location of each of the CMs whereby the assessment tool 10 assesses the ingress influence for each of the selected LTE bands relative to each of the CMs identified with the location data process 32. This may correspond with a dashboard or other construct being provided to a user via the assessment tool 10 whereby the user selects a range or plurality of LTE bands for assessment relative to one or more CMs. A map or other feature may be provided to facilitate the user selecting the CMs for analysis, e.g., a map, such as one similar to that described below for assessing small cell placement, may be utilized to facilitate identifying CMs in a particular area for analysis. An ingress process 36 may relate to assessing interference at the selected CMs according to whether outside, RF signaling within the selected LTE bands exceeds or fails to exceed a threshold associated with interference. The ingress process may include making assessment at the location of the device reporting the corresponding MER data as to interfered and non-interfered subcarriers within the cable plant, i.e., individually characterizing whether any one or more of the selected LTE bands produce ingress relative to any one of the 7,600 (25-kHz spacing) or 3,800 (50-kHz spacing) subcarriers in a cable plant.

An individual CM statistical process 40 may correspond with outputting statistics or other ingress assessment related analytics for each CM, such as according to the following: number, percent in frequency range of interfered subcarriers; SNR(avg) of interfered subcarriers, SNR(avg) of non-interfered subcarriers; and/or a difference SNR(avg). A CM looping process 42 may relate to repeating the analytics for each selected CM relative to each selected LTE band until all CMs have been analyzed. A collective CM statistical process 44 may correspond with tabulating the contemplated analytics for interface with a user, such as to facilitate the dashboards and other interfaces contemplated herein for reporting on ingress assessment, such as according to the following: a spectrum of DOCSIS 3.1 and LTE bands overlapping; a histogram illustrating CMs and percentage of interfered subcarriers; a histogram of CMs and difference SNR(avg); and a selectable mapping of CMs. An LTE looping process 46 may relate to repeating the analytics for each LTE band, i.e., repeating the foregoing processes until the ingress influence of each of the LTE bands relative to each of the CMs has been ascertained and compiled into the desired outputs.

Figure 4:
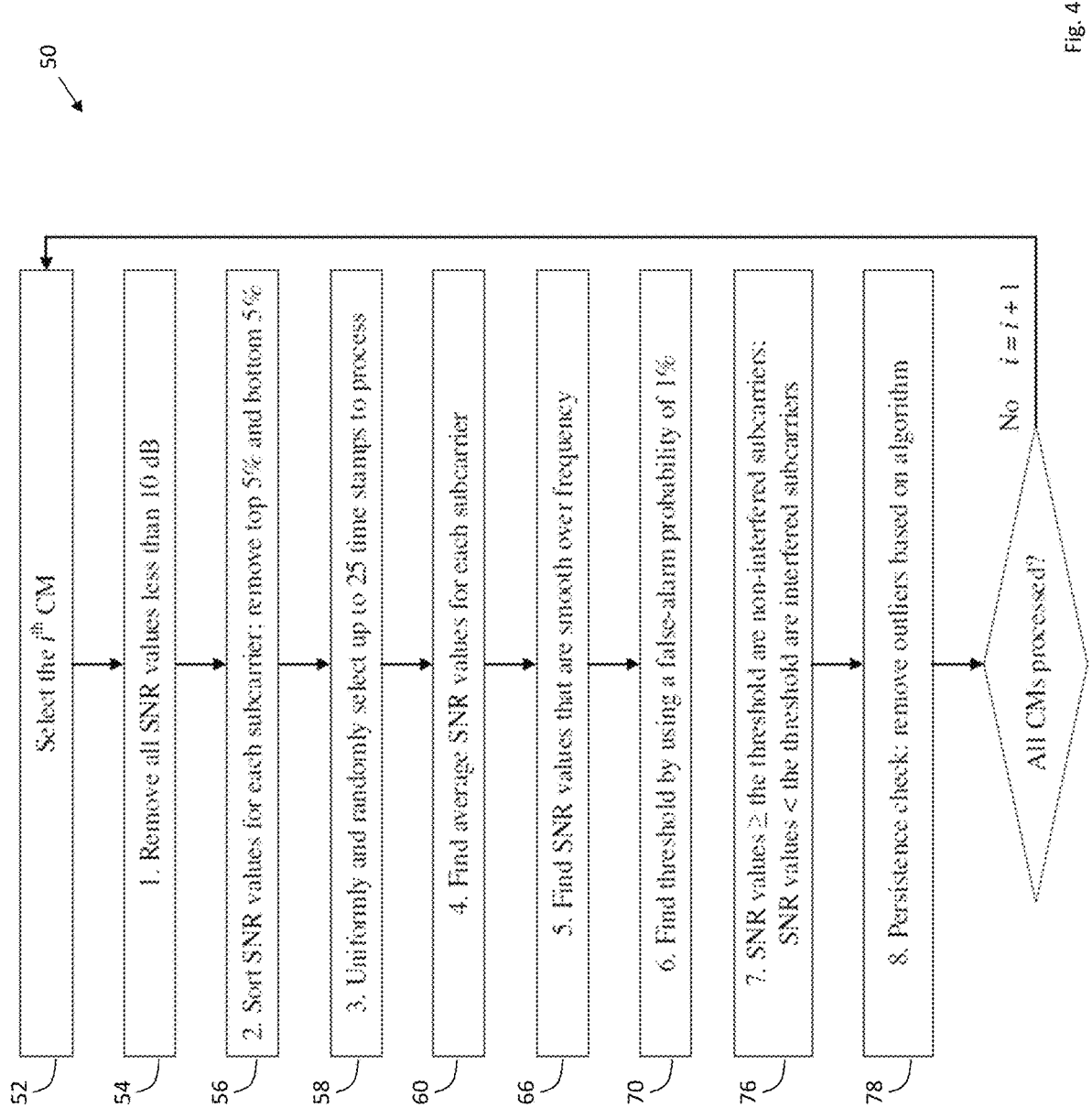
FIG. 4 illustrates a flowchart of an ingress process in accordance with one non-limiting aspect of the present invention.

FIG. 4 illustrates a flowchart 50 of the ingress process 36 described above in accordance with one non-limiting aspect of the present invention. The ingress process 36 may characterize an algorithm suitable to facilitating an assessment as to whether one or more subcarriers utilized in the cable plant may be experiencing ingress from one or more LTE bands. The ingress process may be performed in the illustrated manner by assessing the ingress on selected CMs in a sequential manner whereby the ingress associated with each LTE band may be assessed relative to one CM whereafter the ingress process proceeds sequentially to similarly analyze ingress for each of the remaining ones of the selected CMs. Such an iterative process is merely exemplary of one manner to facilitate the ingress process as the contemplated processing may be performed in parallel or in other sequences to obtain similar results without deviating from scope and contemplation of the present invention. A selection process 52 may be included to identifying an initial CM for the analysis described below in more detail whereafter a counter or other tracking system may be incremented to facilitate identifying the next CM for analysis.

A removal process 54 may cooperate with a sorting process 56 to facilitate grooming the MER data for ingress analysis, which for exemplary purposes is described with respect to processing SNR values provided from the CM actively under analysis. The removal process 54 may correspond with removing SNR values less than a reasonable dB level, e.g., 10 dB, to eliminate values outside of those likely to represent proper measurements or true information, i.e., to statistically eliminate information likely to be associated with false measurements. The sorting process 56 may include removing SNR values outside of the top and bottom percentiles, e.g., the top and bottom 5%, as an additional statistical process for refining the extremes of the SNR values to minimize outliers and improve accuracy of the ingress process. A temporal process 58 may optionally be performed in addition to the removal and sorting processes 54, 56 to further limit the amount of data by uniformly and randomly selecting a desired number of time stamps for processing. Since a CM may upload SNR data collected at one time or over a longer time period, generating a large number of time stamps/values, and since an average value may be used, the number of time stamps can significantly affect the result, i.e., there may otherwise be thousands of values for each subcarrier if a temporal limitation is not applied. The number of time stamps to be processed can be limited to a suitable number, such as 25, so as to provide a reasonable sampling range.

Figure 5:
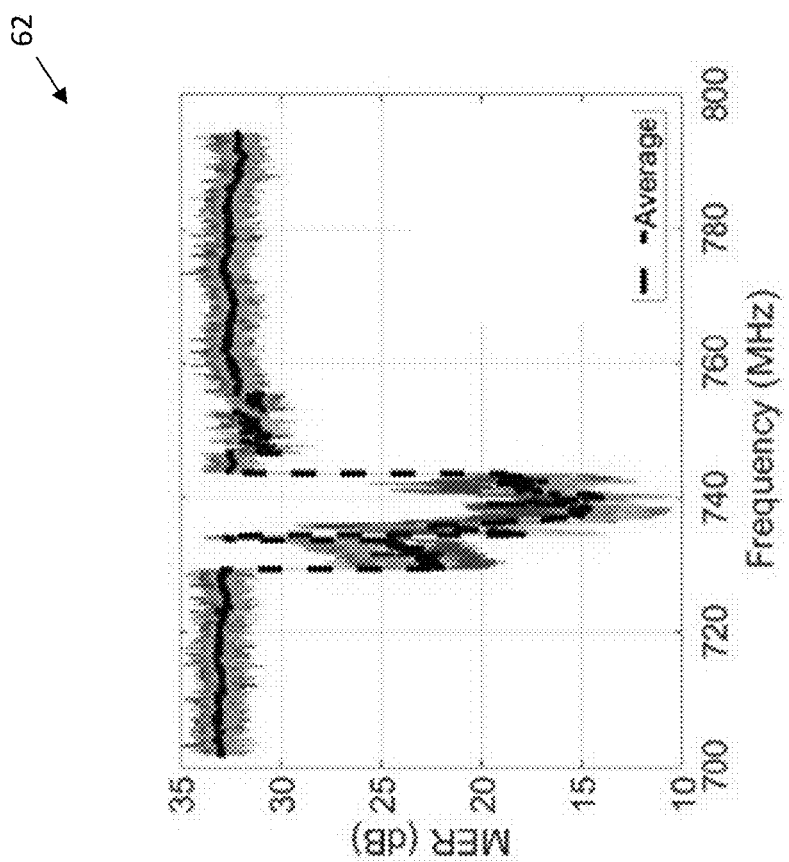
FIG. 5 illustrates a SNR graph in accordance with one non-limiting aspect of the present invention.

An averaging process 60 may include reviewing the SNR values, i.e., the SNR values for a particular CM remaining after the grooming provided by the foregoing processes, for purposes of determining an average SNR across the selected LTE bands. The averaging process may include generating an SNR graph 62 to represent the individual SNR values relative to the average SNR values. FIG. 5 illustrates the SNR graph 62 in accordance with one non-limiting aspect of the present invention. The SNR graph 62 represents the MER data, i.e., SNR values as a function of frequency, for a particular CM with the individual SNR values associated with the selected time stamps being shown as thin lines and a corresponding average being shown as a thicker line. The SNR graph 62 may provide detail as to the average SNR for each of the subcarriers falling within the range of frequencies being analyzed, e.g., 700-800 MHz, which may be considered as raw or unknown data as a change or a variation in the SNR across the spectrum may be indicative of interference but not conclusive as some variation may be tolerable depending on the SNR tolerance of the related CM or the related portion of the cable plant. The SNR graph 62 can provide data relevant to assessing whether individual subcarriers are interfering or not interfering with particular LTE bands but inconclusive as to whether the attendant SNR is sufficient to be characterized as interfered or non-interfered.

Figure 6:
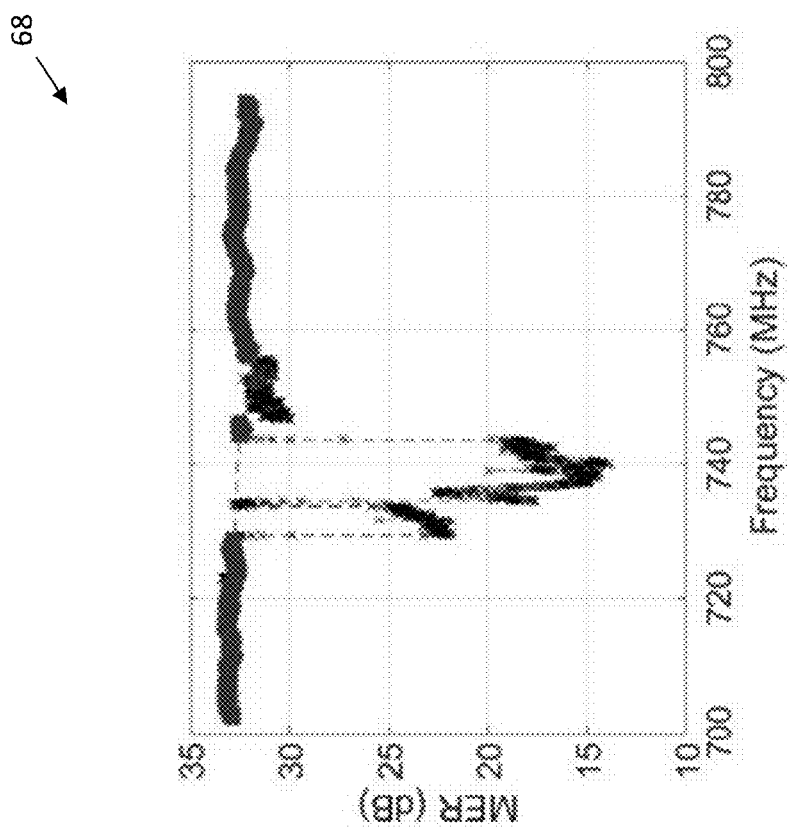
FIG. 6 illustrates a smoothness checking graph in accordance with one non-limiting aspect of the present invention.

Returning to FIG. 4, a smoothness checking process 66 may be utilized to facilitate additionally grooming the data included in the SNR graph 62 for purposes of facilitating an assessment as to whether the average SNR values for each subcarrier are indicative of being interfered or non-interfered. The smoothness checking process 66 may apply a 12-MHz sliding window (e.g., 6 MHz below and 6 MHz above) to each subcarrier whereby any of the average SNR values that differs from any other SNR value within the window by 3 dB or less is considered a smooth subcarrier and suitable for use in further analysis. The smoothness checking process 66 may result in generation of a smoothness checking graph 68 sufficient for representing the average SNR values remaining after removing some of the average SNR values falling outside of the window, i.e., after the smoothing. FIG. 6 illustrates the smoothness checking graph 68 in accordance with one non-limiting aspect of the present invention. One non-limiting aspect of the present invention contemplates utilizing windows of different sizes to facilitate the smoothness checking process 66, however, having the window size similar to the LTE bandwidth is believed to achieve desirable performance for ingress detection. If a subcarrier is near the edge of a DOCSIS 3.1 frequency range, all the frequencies towards the edge and 6 MHz on the other side are used such that having the window 6-12 MHz wide near the two edges and 12 MHz wide in the middle of the DOCSIS 3.1 spectrum is believed to be beneficial.

Figure 7:
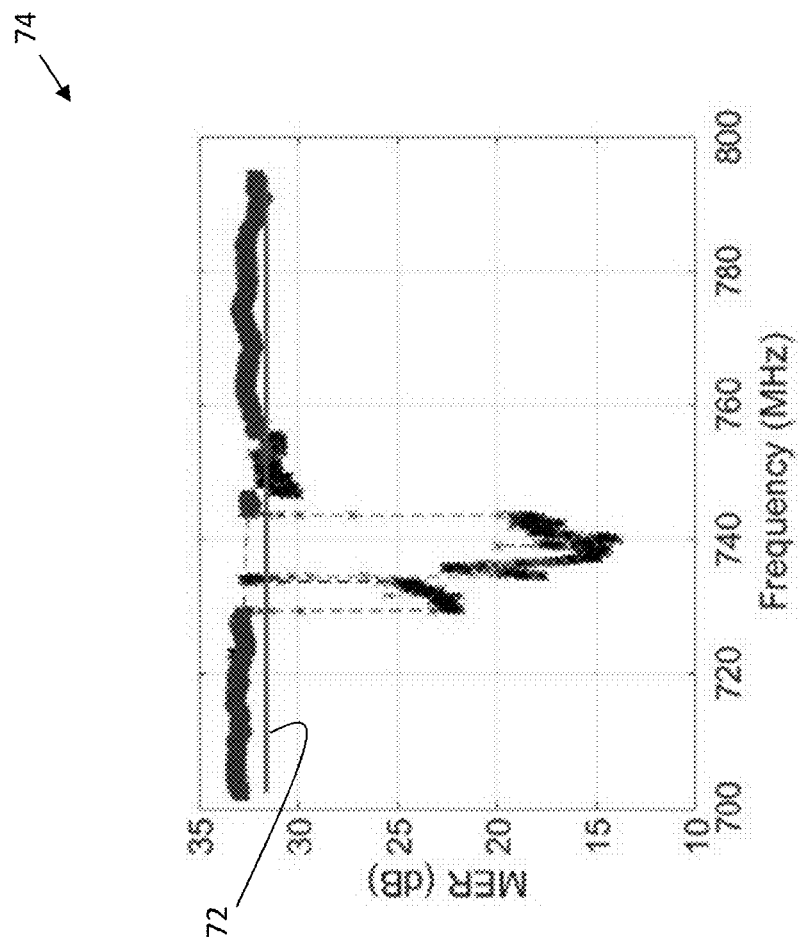
FIG. 7 illustrates a threshold graph in accordance with one non-limiting aspect of the present invention.

Returning to FIG. 4, a probability process 70 may be utilized to facilitate processing the data in the smoothness checking graph 68 according to a false-alarm probability technique to facilitate creating a threshold 72 for detecting interfered and non-interfered subcarriers. The probability process 70 may result in generation of a threshold graph 74 sufficient for representing the threshold 72 used for detecting interfered and non-interfered subcarriers. FIG. 7 illustrates the threshold graph 74 in accordance with one non-limiting aspect of the present invention. The threshold graph 74 may include the threshold 72 as a continuously solid line from a beginning to an ending of the LTE bands under analysis or other suitably shaped reference capable of facilitating self-identifying interfered subcarriers. The subcarriers operating outside of the LTE bands may be presumed to be non-interfered, i.e., to provide a relatively known value for non-interference, which can be useful in facilitating selection of the threshold 72 and corresponding values indicative of interference. One non-limiting aspect of the present invention contemplates implementing the false-alarm probability according to a 1% value such that the threshold 72 for ingress analysis may be set to allow 99% of smooth subcarriers (FIG. 6) above the threshold 72 and 1% below the threshold. Many other non-ideal SNR pattern, such as suckout, may significantly push the threshold to a low value. The false-alarm probability may be used to push the threshold 72 higher to avoid such non-ideal SNR pattern by allowing false values to occur with a probability of 1%. The "false" introduced by the false-alarm probability is further removed by the persistence check step described in.

Figure 9:
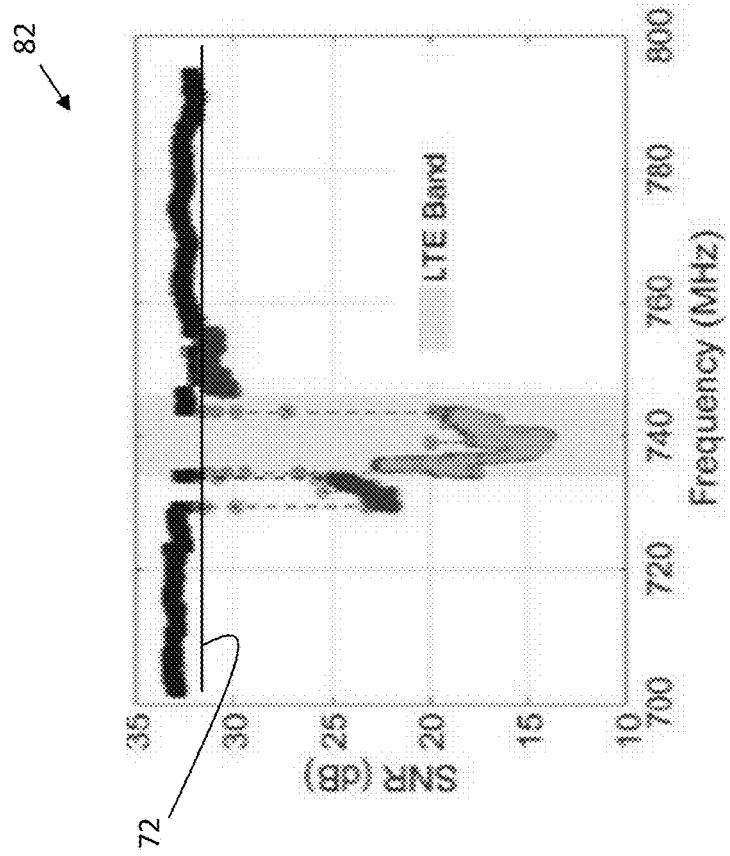
FIG. 9 illustrates an interference graph in accordance with one non-limiting aspect of the present invention.
Figure 8:
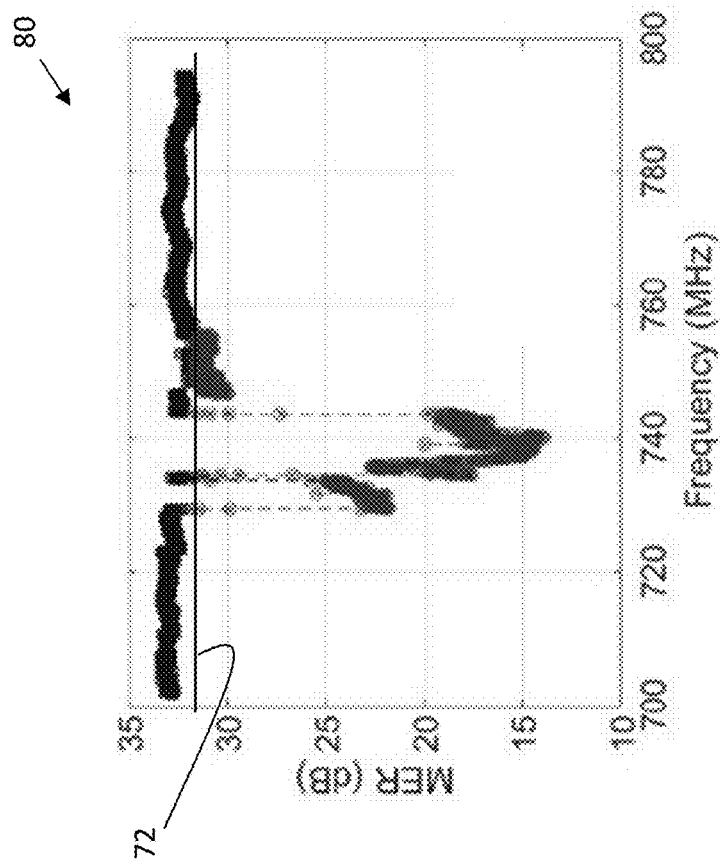
FIG. 8 illustrates a persistence graph in accordance with one non-limiting aspect of the present invention.

Returning to FIG. 4, a threshold process 76 may be implemented to determine the interfered and non-interfered subcarriers. The threshold process 76 may include identifying any subcarriers corresponding with SNR values below the threshold 72 as interfered subcarriers and any subcarriers with SNR values above the threshold as non-interfered subcarriers. A persistence process 78 may be implemented to facilitate removing outliers resulting from potential errors introduced with the false-alarm probability and/or other sources, e.g., suck out. The persistence process 78 may check a reasonable number of subcarriers, e.g., 15, on two sides of an interfered subcarrier such that the interfered subcarrier may be removed from the interfered list of subcarriers if no more than 15 out of these 30 subcarriers are interfered. The persistence process 78 may result in generation of a persistence graph 80 showing the subcarriers remaining after the subcarriers identified in FIG. 7 as being interfered are removed. FIG. 8 illustrates the persistence graph 80 in accordance with one non-limiting aspect of the present invention. The persistence process 78 or an additional interfacing process may include generating an interference graph 82 for highlighting subcarriers relative to a particular LTE band. FIG. 9 illustrates an interference graph 82 in accordance with one non-limiting aspect of the present invention.

The persistence process 80, operating in cooperation with the additional data grooming processes noted above, may be beneficial in facilitating assessment of interfered and non-interfered subcarriers. This process for detection of ingress using passive and non-intrusive methodologies may rely upon PNM data collected from CMs. The reliance on relatively unknown PNM data can present difficulties in assessing whether the related SNR or other relied upon statistics are sufficient for indicating interfered and non-interfered subcarriers. Because some CMs may be more tolerant to SNR than others and/or due to other operating deviations between CMs, the present invention contemplates performing relative calculations for each CM to determine on a CM-by-CM basis whether the SNR values associated therewith are indicative of ingress, i.e., the threshold determined for interfered and non-interfered subcarriers may vary from CM to CM depending on the statistical processes noted above. Given the number of available subcarriers, particularly within DOCSIS 3.1, a reference point for interfered and non-interfered subcarriers may be unknown in comparison to such a reference point being more well-known in DOCSIS 3.0 due to DOCSIS 3.0 having fewer channels overlapping with LTE bands versus DOCSIS 3.1 having thousands of subcarriers overlapping with LTE bands. The ingress process contemplated herein and described above with respect to various statistical or data grooming processes may be particularly advantageous in combating the analysis difficulties associated with DOCSIS 3.1 by providing an analysis process sufficient for performing relative calculations on a CM-by-CM basis.

Returning to FIG. 2, the ingress process 36 may be used to provide or otherwise identify interfered and non-interfered subcarriers, such as for use with the individual and collective CM processes 40, 44. This may include statistics of an individual CM being gathered from the interfered subcarriers so as to include the number and percentage of interfered subcarriers, their frequency range and the average SNR. The average SNR of all non-interfered subcarriers may also be calculated. From these two average values, the change in SNR (or depth of interference), ΔSNR, may be calculated. Interfered subcarriers overlapping with each individual LTE band may also be discovered and corresponding statistics generated. SNR and LTE ingress can be characterized in multiple dimensions, including width of ingress (frequency or subcarriers), depth of interference (ΔSNR), number of CMs, and location of ingress points. The assessment tool 10 can optionally provide statistics in four formats: (1) spectrum: listing active DOCSIS 3.1 spectrum for all CMs; (2) histogram: number of CMs vs. ΔSNR; (3) histogram: number of CMs vs. percent of interfered subcarriers; and (4) map: CM locations plotted in maps with colors indicating interference depth and width. These statistics may be generated for all frequencies as well as for each LTE band.

4G LTE and 5G small cells may be typically low power and provide short-range coverage in both indoor and outdoor environments. The inherent nature of cable plants, which consists of a hybrid-fiber coaxial network and strands- and poles-based infrastructure, may be well suited to host small cells, providing high-speed data backhaul and infrastructure to mount small cells. However, small cells can be a source of RF interference into cable plant points of ingress, causing degraded service. The assessment tool 10 may be configured to facilitate predicting areas in the cable plant where a hosted small cell would have a low risk of causing RF interference. FIG. 1 shows a cable plant in which an optical node typically converts an optical signal to an electrical signal in the frequency range from 50 MHz to 1.2 GHz. An amplifier, tap, CM, or co-axial cable at any location after the node could be a potential point of ingress. To maintain a desired throughput of cable service, the CM's SNR should meet a minimum value, e.g., a 256-QAM modulation rate may require an SNR of 27 dB. The contribution of RF interference from a small cell should be low enough to not impact the minimum SNR at the location. The assessment tool 10 may rely upon LTE ingress algorithm described in FIG. 2 to facilitate determining the minimum distance between a small cell and a potential point of ingress to ensure that the RF interference is low.

FIG. 1 also shows an existing LTE macrocell with newly proposed small cells 14, 16. In this example, the leakage point (i.e., the point of ingress) may be assumed to be at a CM at a location 84 such that if the CM has a high amount of leakage, correlating with low shielding (i.e., 0 dB) and little protection against ingress, then the distance between the small cell and the leakage point (i.e., the CM) should be large to maintain a sufficient SNR, e.g., at location 14. If the CM shielding is increased to 40-50 dB, representing increased protection against ingress, then the required distance can be shorter, e.g., at location 16. New small cells placed near a cable plant may generate additional ingress. To maintain throughput in a cable plant, the SNR may need to be greater than the required SNR ($SNR_r$), such as the exemplary SNRr listed in Table 1.

TABLE 1

REQUIRED SNR FOR DOCSIS 3.1 NETWORKS

| | | $SNR_r$ (dB) | |
|---|---|---|---|
| Test Point | Constellation | Frequency range <1 GHz | Frequency range 1-1.2 GHz |
| 1 | 4096 | 41 | 41.5 |
| 2 | 2048 | 37 | 37.5 |
| 3 | 1024 | 34 | 34 |
| 4 | 512 | 30.5 | 30.5 |
| 5 | 256 | 27 | 27 |
| 6 | 128 | 24 | 24 |
| 7 | 64 | 21 | 21 |
| 8 | 16 | 15 | 15 |

SNR may be calculated from the downstream power ($P_{DS}$) measured at a CM, noise plus existing interference level (N) from MER data and additional LTE ingress (I) introduced by the new small cell, all in linear scale:

$$P_{DS} \div (N+I) = SNR > SNR_r.$$

Downstream power data, MER data, and values given in Table 1 may be used to calculate the maximum tolerable interference (Imax), and the minimum path loss (PL) may be determined from the equivalent isotropic radiated power (EIRP) and shielding. Then, the minimum distance between the leakage/ingress point and a new small cell can be estimated based on a path loss model and shielding:

$$PL(d) = PL(d0) + 10 \log 10(f) + 10n \log 10(d),$$

where PL(d0) is the path loss at a reference distance of 1 m (−27.56 dB), f is the frequency in hertz, d is the distance in meters, and n is the path loss exponent. The small cell placement algorithm may offer several options for the user to select, including: five options for n from 2 to 4 with an increment of 0.5; two EIRP levels, 5 or 20 watts, for the new small cell; and six options for modem shielding from 0 to 50 dB with an increment of 10 dB.

Figure 10:
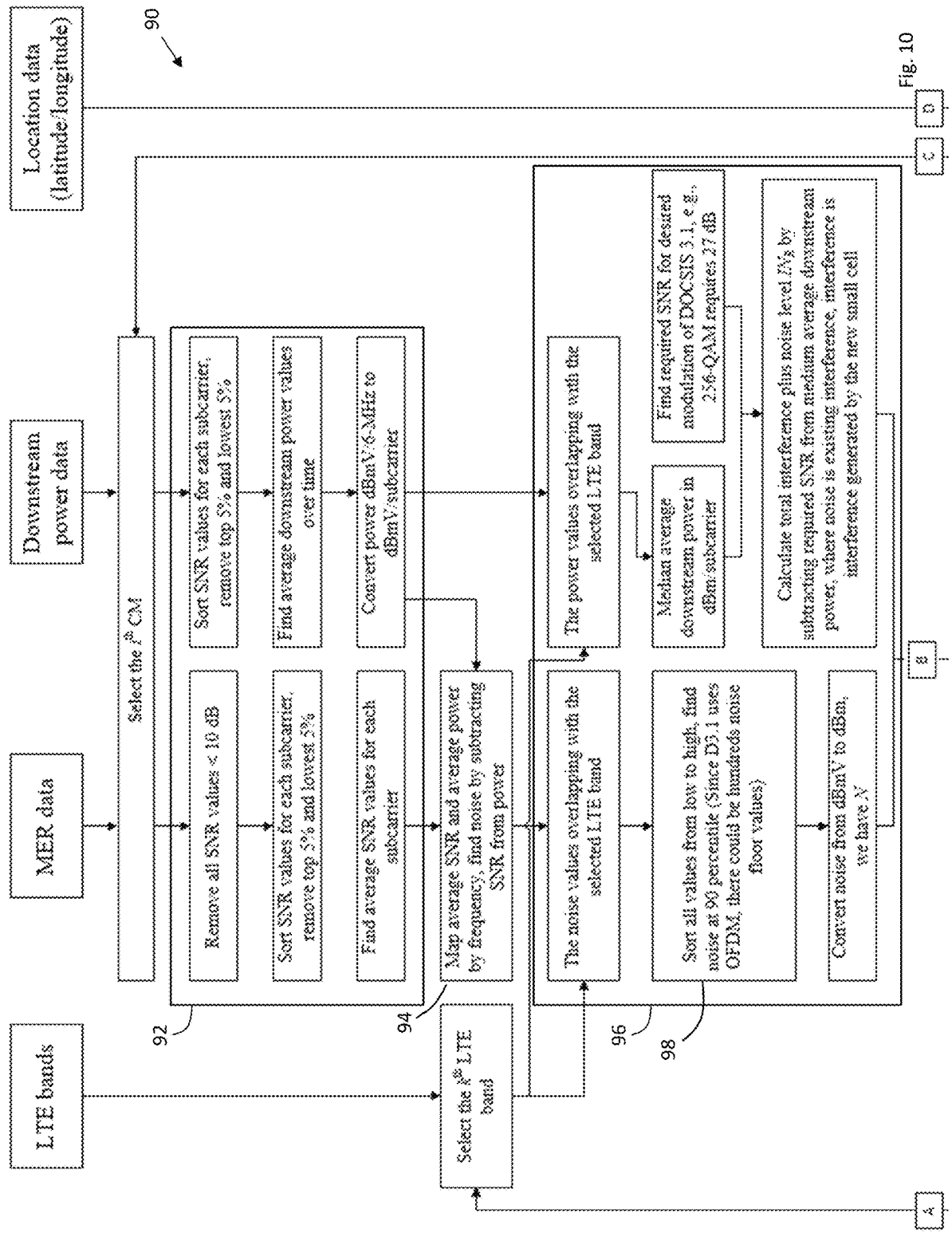
FIG. 10 illustrates a flowchart of a method for determining small cell placement in accordance with one non-limiting aspect of the present invention.
Figure 10:
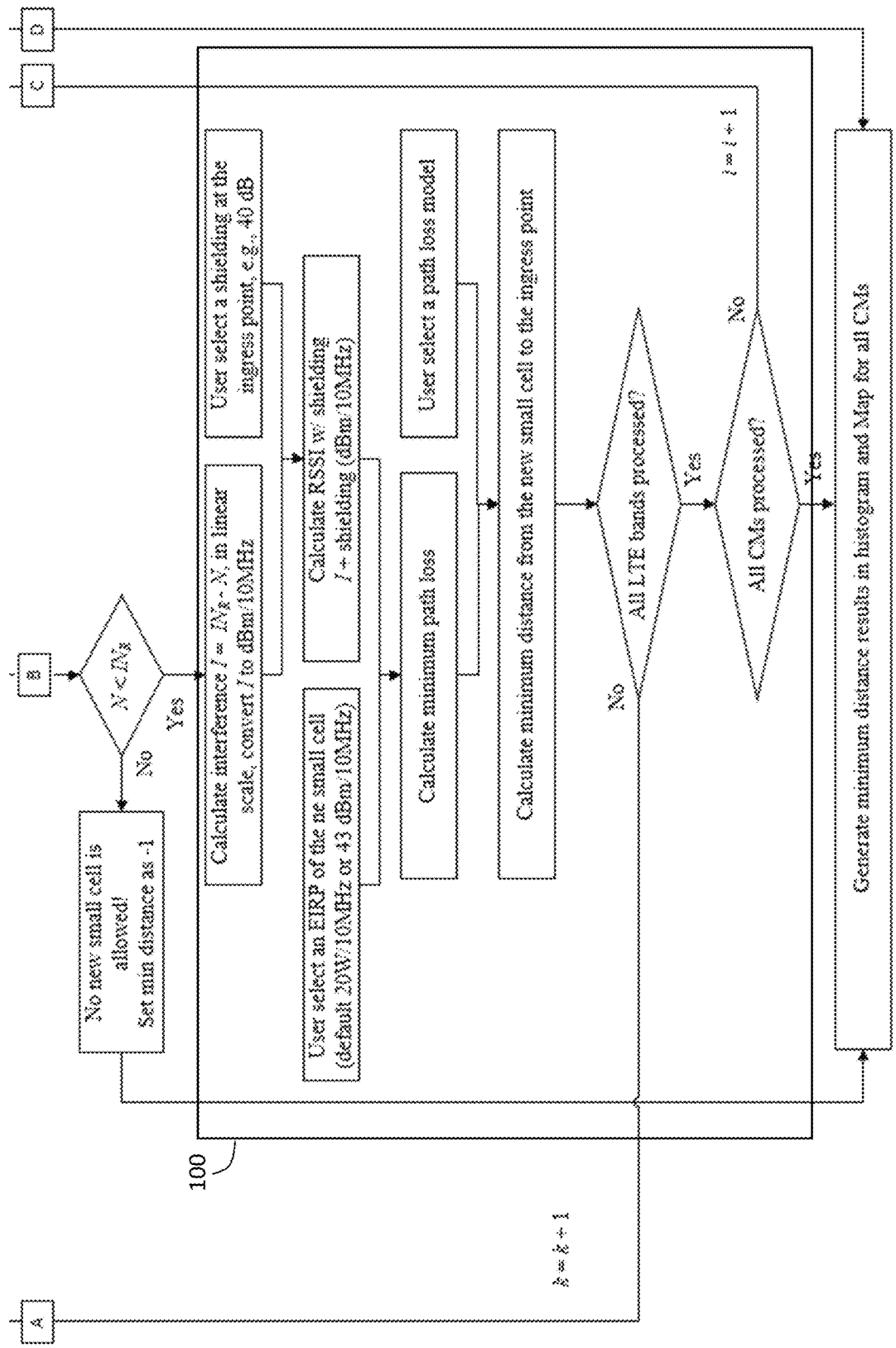

FIG. 10 illustrates a flowchart 90 of a method for determining small cell placement in accordance with one non-limiting aspect of the present invention. The method may facilitate positioning LTE devices relative to the cable pant 12 when DOCSIS 3.1 or other strategy is employed to facilitate communications over thousands of subcarriers, i.e., to facilitate determining small cell placement relative to LTE or other RF ingress when the number of potentially influenced subcarriers is much greater than that associated with DOCSIS 3.0 or other strategy employing a limited number of subcarriers/channels. The assessment tool 10 may execute the method by obtaining MER data, LTE band data, location data and downstream power data, such as in the manner described above, to facilitate a CM-by-CM analysis of how closely a small cell or other suitable source may be positioned relative to each CM based on an amount of ingress associated with each LTE band anticipated for use thereat. A statistical process 92 may correspond with various subprocesses to facilitate grooming the MER data in downstream power data for analysis. A normalization process 94 may correspond with accounting for downstream power being measured across 6 MHz and SNR being measured on a per subcarrier basis, i.e., to normalize the corresponding measurements to a common scale sufficient to facilitate the placement calculations.

Once the SNR values and downstream power values are groomed and normalized, an assessment process 96 may correspond with determining whether the small cell placement is permissible, i.e., whether N is less than $IN_R$. The assessment process 96 may include a sorting process 98 to account for the cable plant having thousands of subcarriers within one of the selected LTE bands by using the noise associated with the $90^{th}$ percentile as the benchmark or value for the assessment process. This may include sorting the noise for each of the subcarriers overlapping with the selected LTE band from high to low for purposes of determining the $90^{th}$ percentile. Additional subprocesses may be performed as noted to facilitate further grooming of the data used as part of so as to enable use of actual measurements taken at the CMs for comparison to potential small cell locations. A distance process 100 may correspond with determining an appropriate distance of a small cell relative to each of the CMs based on the selectable values noted above with respect to shielding, EIRP, RSSI, etc. The foregoing processes may be repeated across each LTE band in order to provide a hypothetical comparison of how placement of a small cell is likely to influence the system, i.e., to relate actual measurements taken at the CMs relative to expected ingress from LTE depending on small cell placement.

Figure 11:
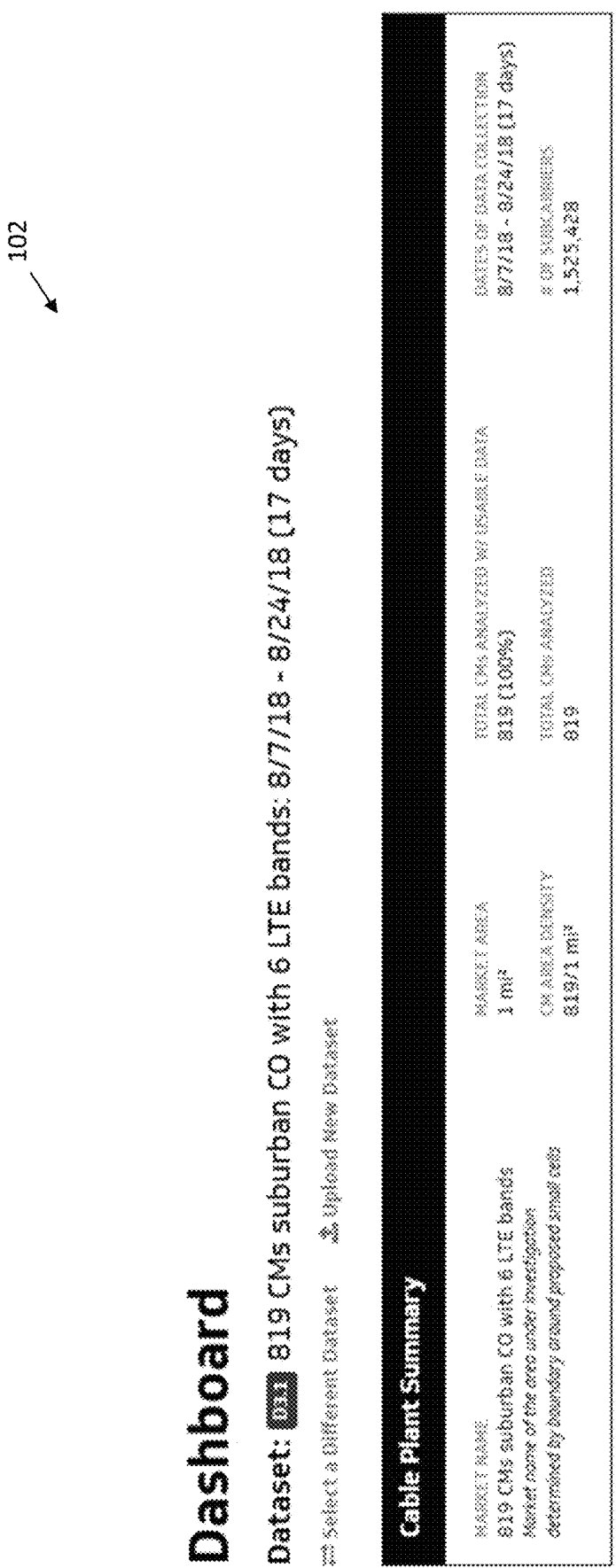
FIGS. 11 and 12 respectively illustrate summary and spectrum dashboards in accordance with one non-limiting aspect of the present invention.
Figure 12:
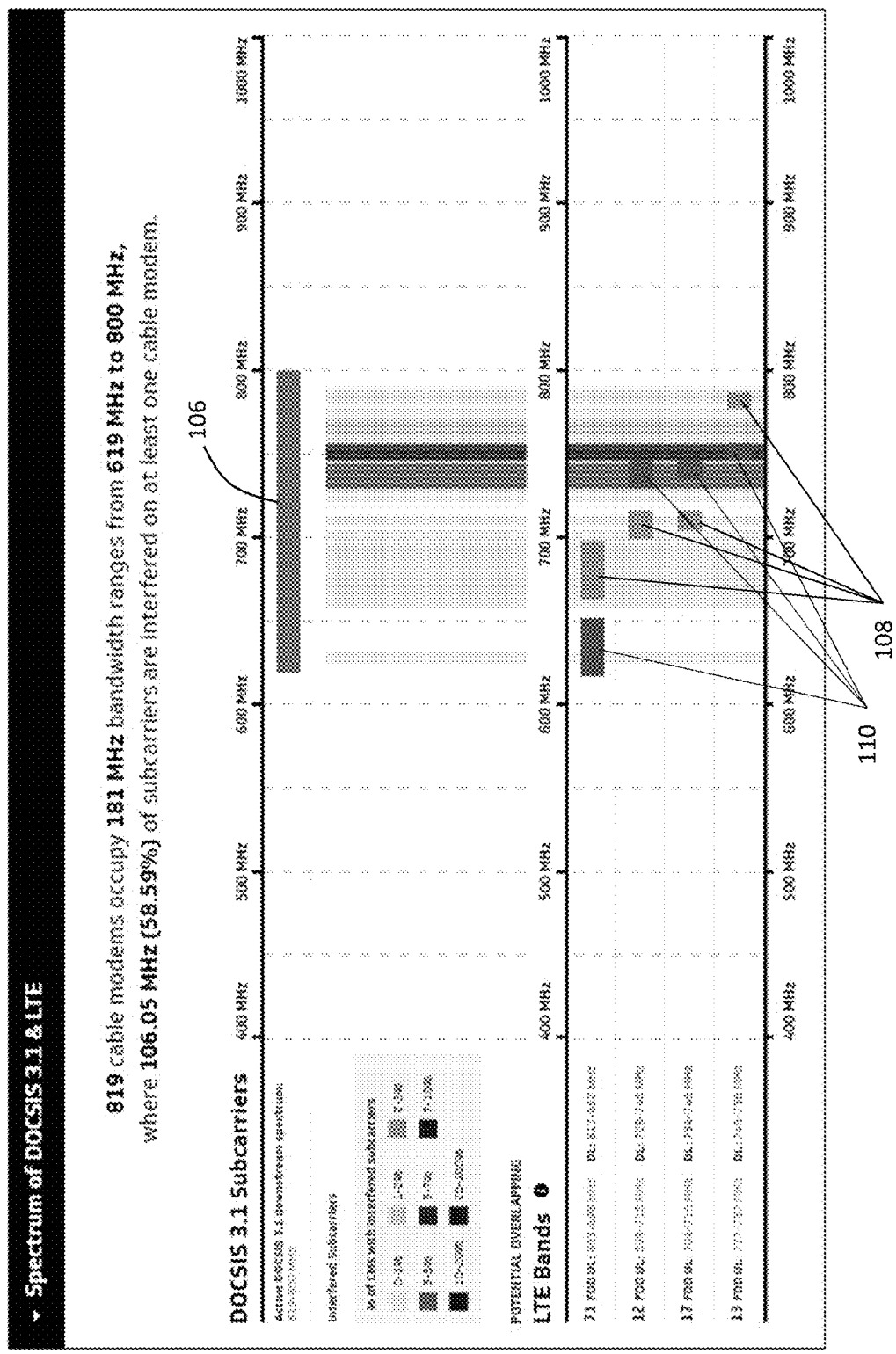

FIGS. 11 and 12 respectively illustrate a first two sections on the dashboard for a cable plant summary 102 and a spectrum graph 104 in accordance with one non-limiting aspect of the present invention. The spectrum graph 104 may be designed to statistically show where strong levels of ingress overlap between the LTE bands and the DOCSIS 3.1 spectrum, which may allow cable operators to identify frequencies of high ingress that need to be mitigated or avoided for active block or PHY link channel (PLC) implementation. The top part of the spectrum lists active DOCSIS 3.1 subcarriers for all CMs (bar 106), and the bottom part lists potential interfering LTE bands (bars 108 for LTE FDD [Frequency Division Duplexing] uplink and bars 110 for downlink). The vertical bars indicate the percentage of CMs that are impacted at a given frequency; a darker shade means more CMs are interfered. In this example, bands 12 downlink (DL) and 13 DL, which are operated by mobile operators in the area, generate strong interference. The DOCSIS 3.1 spectrum ranges from 50 MHz to 1.2 GHz, but only the 400-1000 MHz band overlaps with LTE signals. The spectrum ranges from 400 to 1000 MHz with granularity of 1 MHz.

Figure 13:
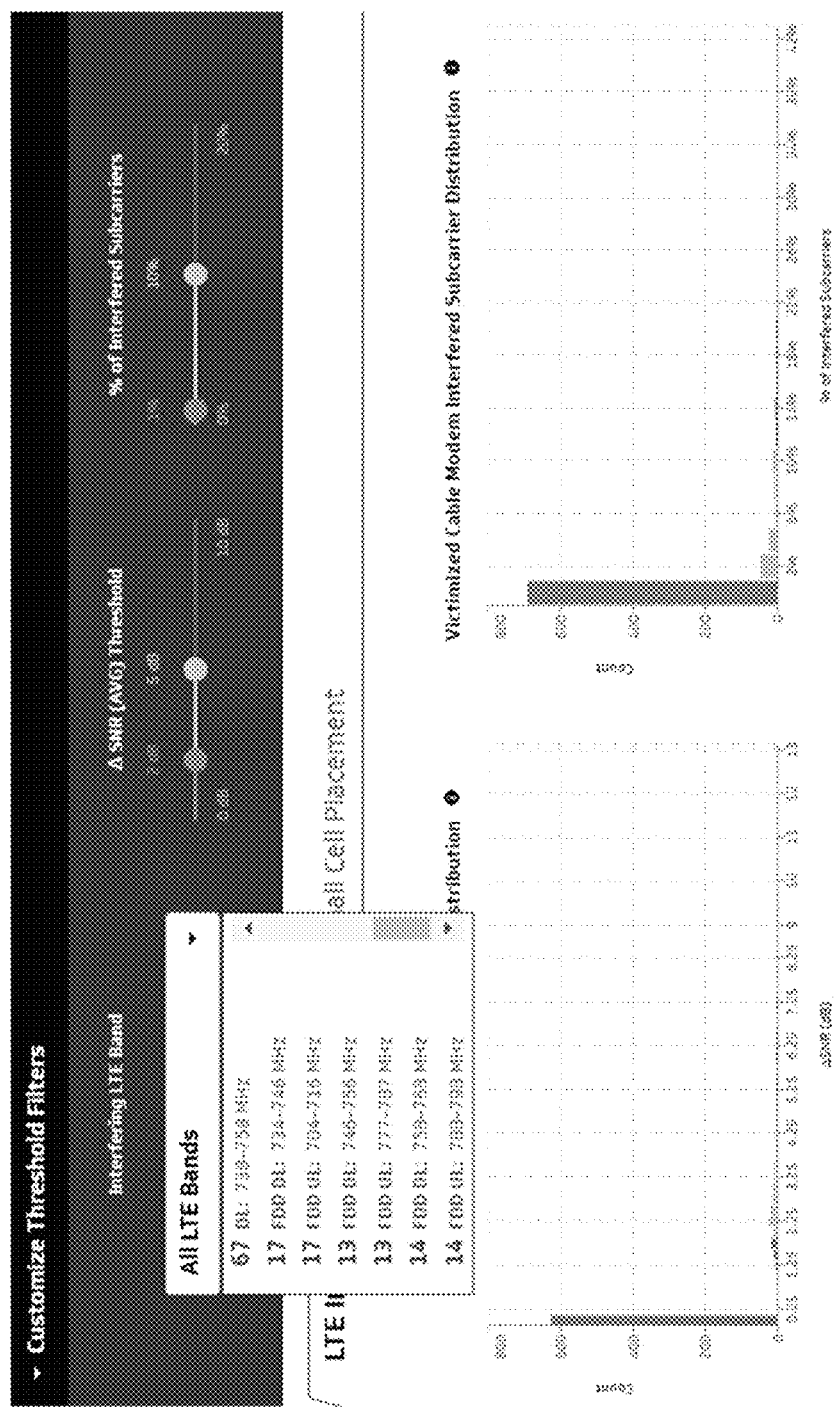

FIGS. 13 and 14 respectively illustrate histograms 112, 114 contemplated in accordance with one non-limiting aspect of the present invention. The histograms 112, 114 may be used to provide statistics for all CMs: number of CMs vs. ΔSNR and number of CMs vs. percent of interfered subcarriers. Three threshold filters above each histogram allow users to select an interfering LTE band of interest and customize colors. FIG. 13 shows the results for all LTE bands. In this example, there are 819 CMs in the uploaded dataset with 160 CMs exhibiting interference. A color coding may be used to indicate CMs that are not impacted; the remaining bars indicate impacted CMs. As shown in FIG. 12, LTE band 13 DL introduces the most intense ingress. FIG. 14 shows how the impact by this LTE band can be individually investigated. Results show that 84 CMs are impacted by LTE band 13 DL. The depth of interference is up to 13 dB. The bandwidth of band 13 is 10 MHz, which overlaps 200 50-kHz subcarriers in the DOCSIS 3.1 spectrum. The red bar at the far right indicates that for 3 CMs, 94% of subcarriers (188 out of 200) are impacted by LTE band 13 DL.

Figure 15:
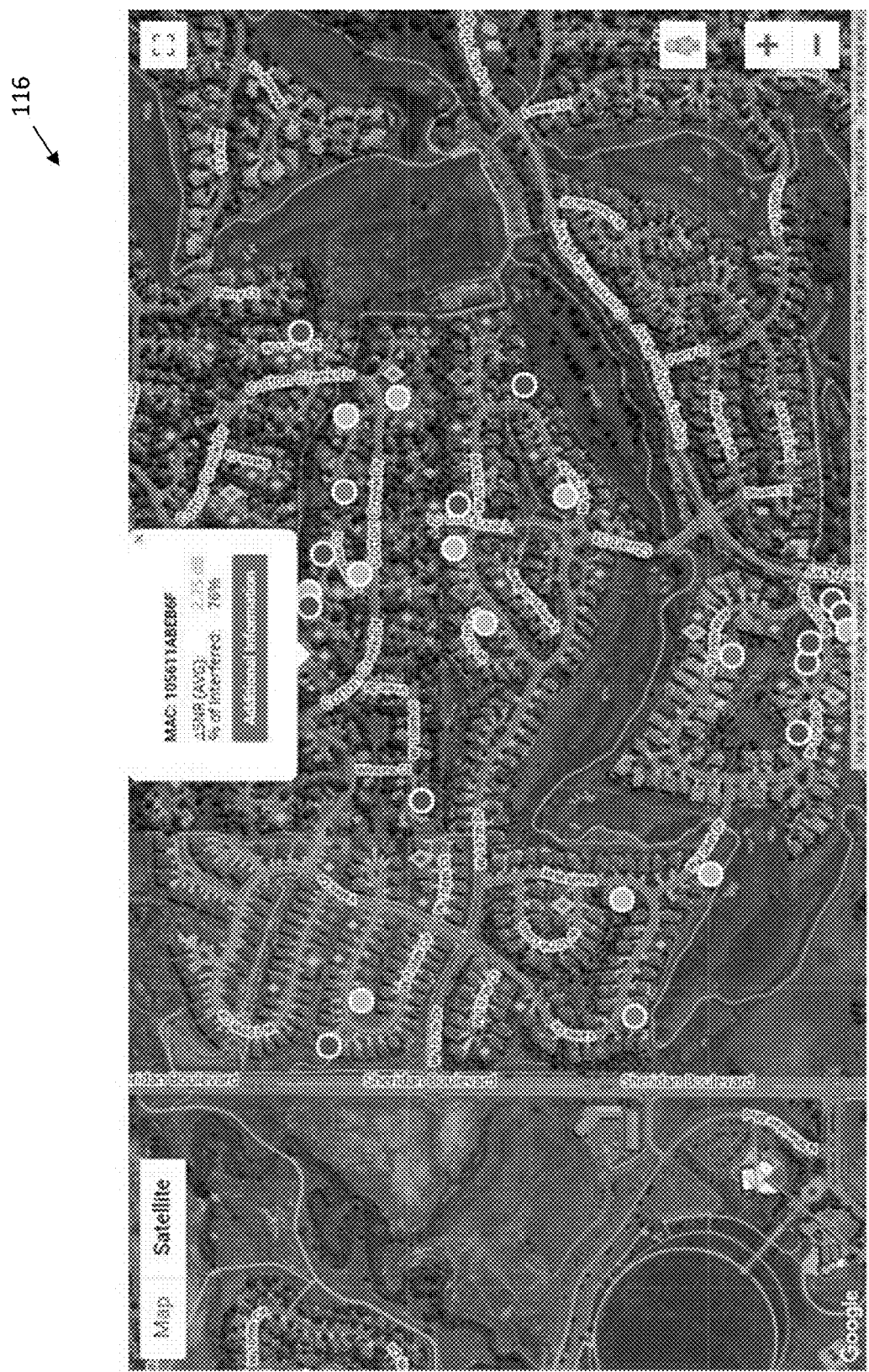
FIG. 15 illustrates a map view in accordance with one non-limiting aspect of the present invention.

FIG. 15 illustrates a map view 116 in accordance with one non-limiting aspect of the present invention. The map view may be used to indicate a location of all CMs in a map. For each CM indicator, the face color or other suitable color coding or shading may be used to denote ΔSNR with an additional outline color whether shading to denote percent of interfered subcarriers. All 819 CMs in the sample data are in a single-family-home neighborhood in Westminster, Colo. (suburban of greater Denver metropolitan area). Because LTE band 13 DL is selected (FIG. 14), 84 CMs interfered by LTE band 13 DL are shown on the map. The 12 CMs clustered at the bottom of the map are likely on the same cable plant branch. It is possible that an amplifier, tap, or coaxial cable on this branch could be the leakage point. A Keyhole Markup Language (KML) file is available for download for further analysis. Selecting a CM icon on the map displays the ΔSNR and percent of interfered subcarriers. By selecting "additional information," the tool takes the user to "Detailed Results for an Individual CM" (see FIG. 16).

Figure 16:
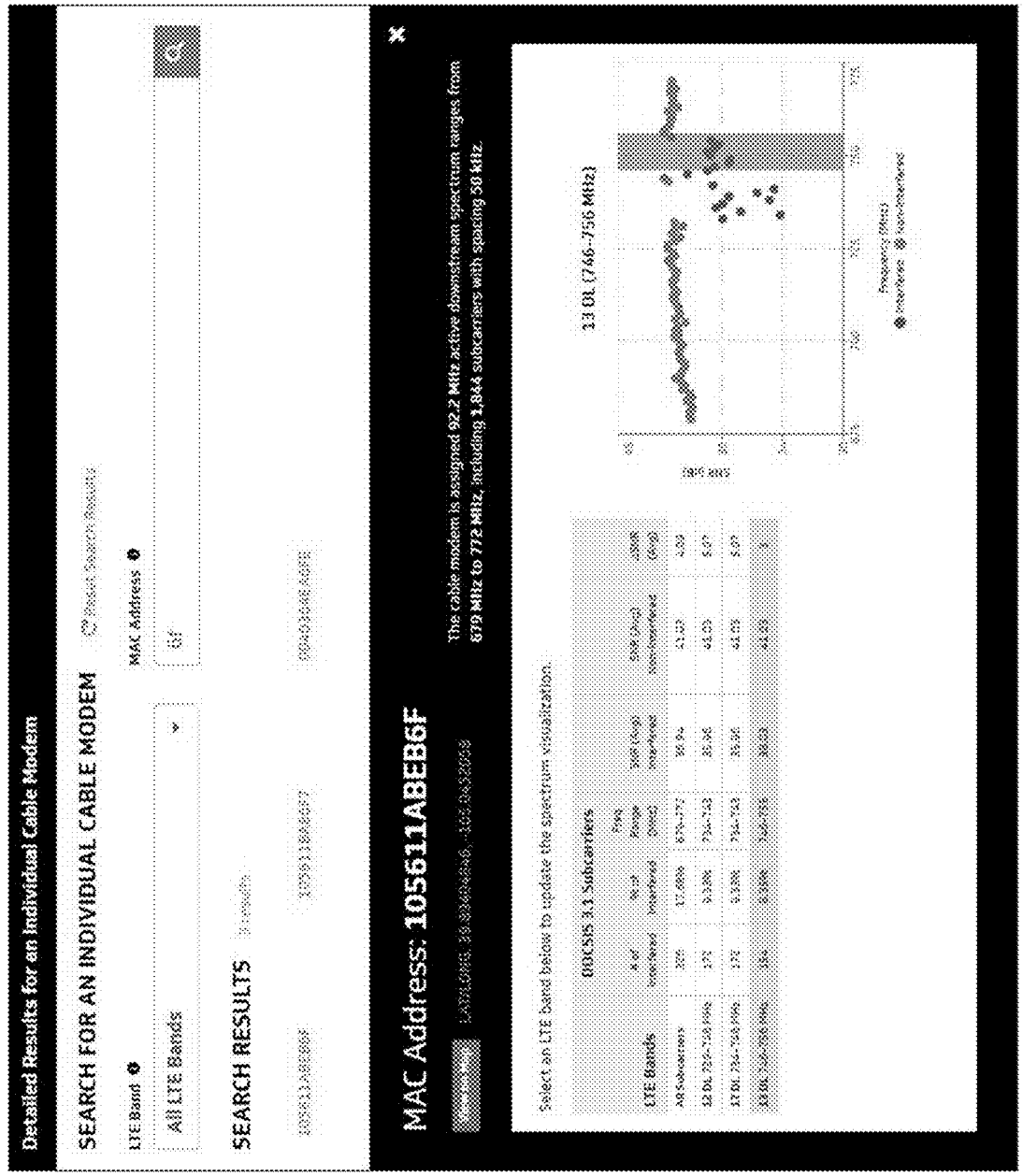
FIG. 16 illustrates an individual CM dashboard in accordance with one non-limiting aspect of the present invention.

FIG. 16 illustrates an individual CM dashboard 118 for investigating results in accordance with one non-limiting aspect of the present invention. In addition to viewing high-level statistical results, the user can also investigate results at an individual CM level. Three methods may be provided to find a specific CM: (1) type in the MAC address or partial MAC address, (2) select an LTE band for a list of all CMs impacted by this band; or (3) select a CM in the maps view as shown in FIG. 15. The detailed results display the MAC address, location, frequency range, number of subcarriers, and subcarrier spacing for an individual CM. As a result of the persistent process noted above, a graph of SNR vs. frequency may be provided, showing interfered and non-interfered subcarriers. A table presents breakdown statistics for each LTE band. In this example, LTE band 13 DL interferes 154 subcarriers, equal to 8.35% of the total 1844 subcarriers (note that this number represents all subcarriers; however, the total number shown in FIG. 14 is 200, which represents subcarriers overlapping with LTE band 13 DL). The frequency range for interfered subcarriers overlapping with LTE band 13 DL is 746-755 MHz, the average SNR of interfered subcarriers overlapping with LTE band 13 DL is 38.03 dB, the average SNR of all non-interfered subcarriers is 41.03 dB, and the ΔSNR is 3 dB.

Figure 17:
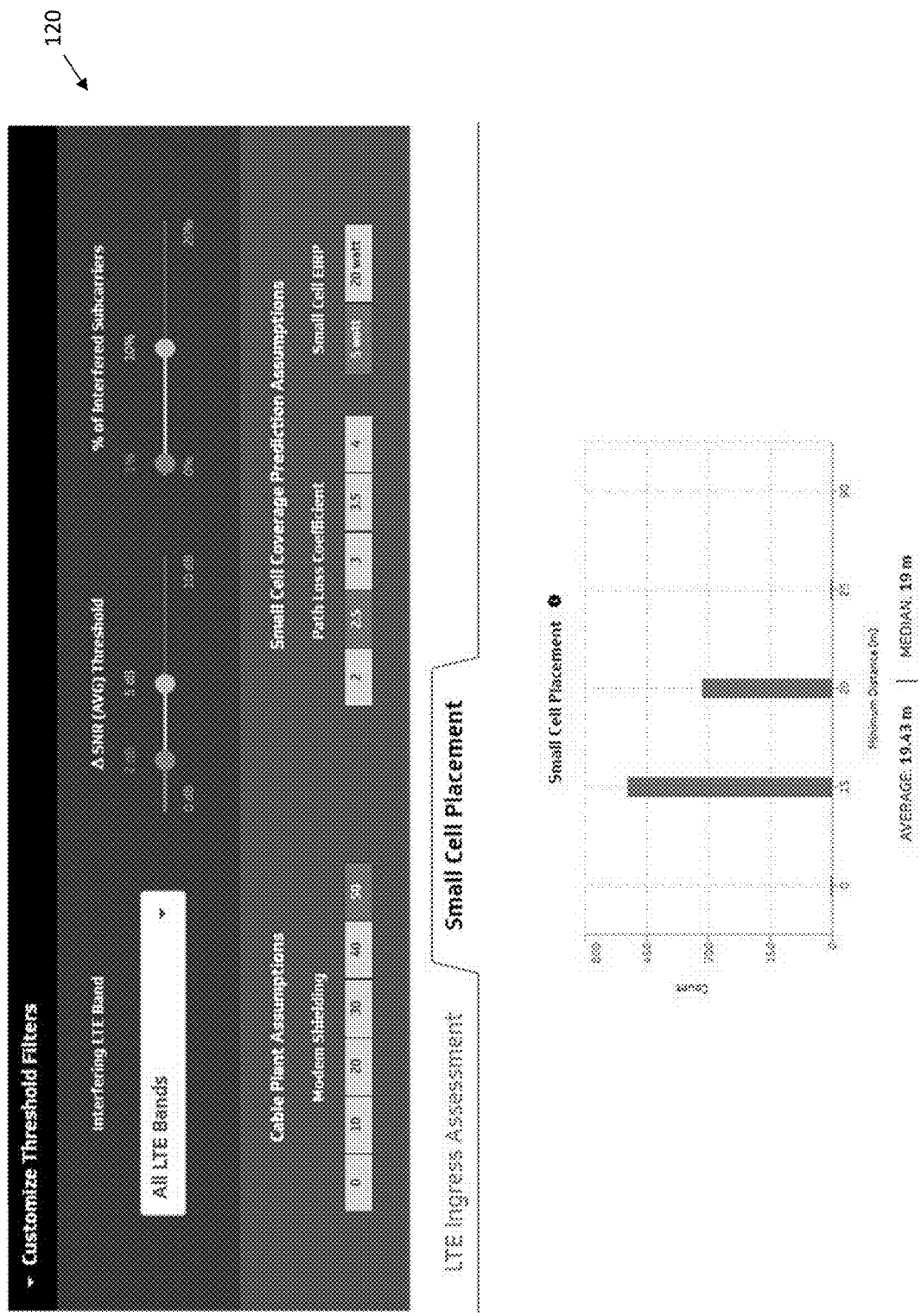
FIGS. 17 and 18 respectively illustrate small cell placement in accordance with one non-limiting aspect of the present invention.
Figure 18:
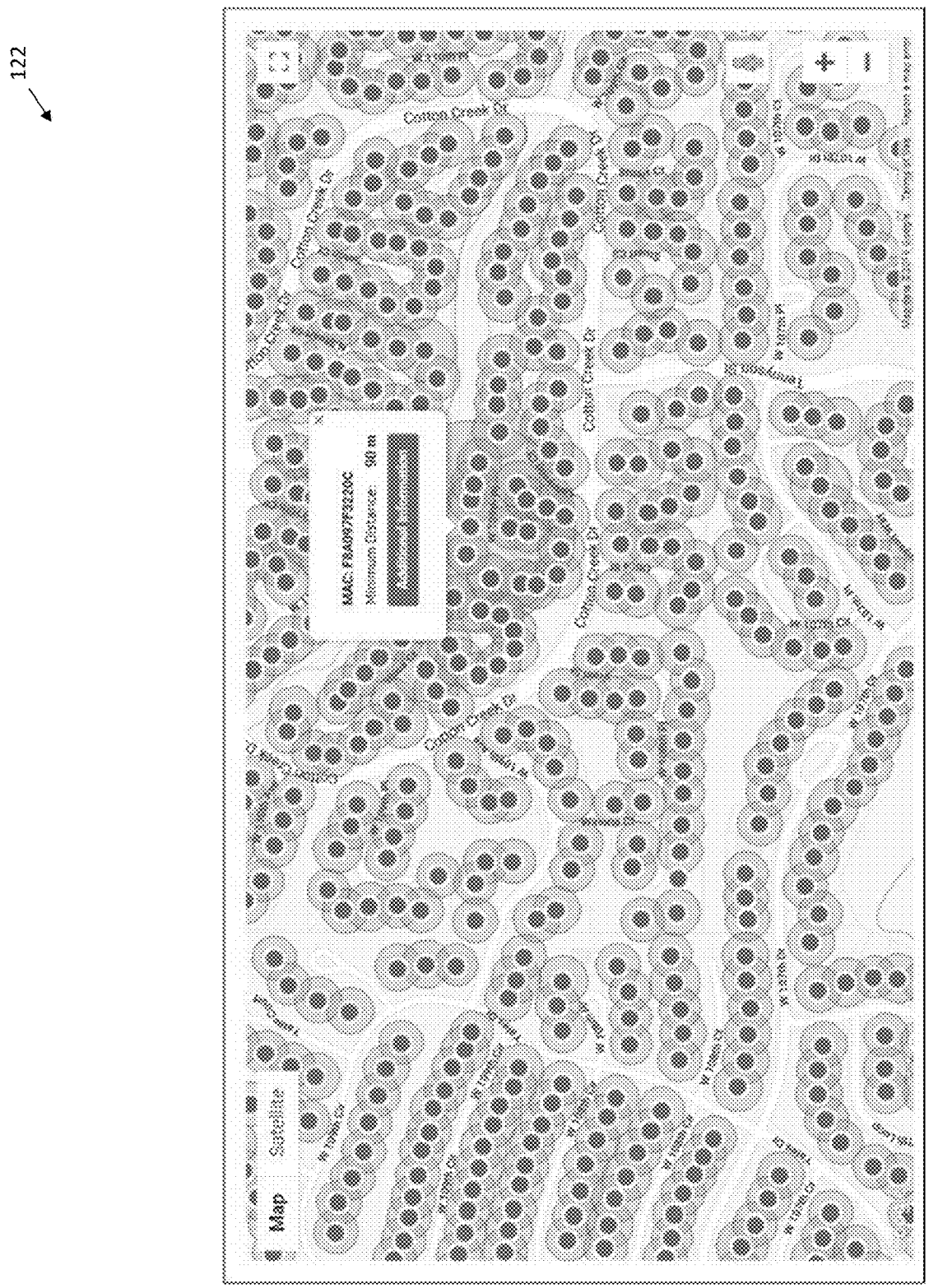

FIGS. 17 and 18 illustrates a shielding dashboard 120 and a related map dashboard 122 in accordance with one non-limiting aspect of the present invention. The shielding dashboard 120 may be used to represent a result of the small cell placement section of the tool whereby the user has a few parameters to choose to conduct analysis, including shielding, path loss model, and small cell EIRP. FIG. 17 shows the result of a CM with shielding of 50 dB, representing a high level of shielding (e.g., tightly fitted CM connectors). The minimum distance for CMs is approximately 15-20 m with a maximum value of 90 m (FIG. 18). The locations of CMs and the minimum distances are illustrated in Maps (FIG. 18). The radius of each circle indicates the minimum distance. No small cell can be deployed within any of these circles, but the gap areas between the CM circles are sufficient for small cell placement. If the shielding is changed to 10 dB, representing low level of shielding (e.g., loosely fitted CM connectors), then the minimum distance increases to 800 m. In that case, no new small cells could be deployed in this neighborhood. The minimum distance could also be changed by changing the path loss exponent or the EIRP.

As supported above, the present invention contemplates an LTE ingress detection tool supporting the following actions: identify location, frequency, and intensity of interference (LTE ingress); mitigate interference and improve service delivery; groom and assess a cable plant for DOCSIS 3.1 network deployment readiness; identify "egress" (leakage) to minimize impact to mobile operators for FCC compliance; identify non-LTE sources of RF interference; provide data for historical analysis; identify locations in a cable plant with low risk of interference that can be marketed as a small cell host to external/internal customers; and assess the feasibility of 4G/5G small-cell implementation into the cable plant. The tool may analyze MIB data collected from a cable plant and generate high-level statistical results that can be used to identify and locate leakage. Statistics include width of LTE ingress, depth of interference, the number of impacted CMs, and location of ingress. The algorithm can automatically identify subcarriers that are interfered by LTE ingress by using a false-alarm probability and a persistence check.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for assessing ingress in a communication network, the ingress resulting from signaling originating outside of the communication network interfering with signaling in use over the communication network, the method comprising:
   collecting signal-to-noise ratio (SNR) values for a plurality of subcarriers in use over the communication network;
   implementing a threshold process to generate a threshold for assessing interference, the threshold being generated as a function of processing the SNR values according to the threshold process; and
   implementing an ingress process as part of the threshold process, the ingress process including a removal process for removing the SNR values less than a predefined value from use in generating the threshold.

2. The method of claim 1 further comprising implementing the ingress process to include a sorting process, the sorting process removing a top and bottom portion of the SNR values remaining after the removal process from use in generating the threshold.

3. The method of claim 2 further comprising implementing the ingress process to include an averaging process, the averaging process determining an average SNR value for each of the plurality of subcarriers from the SNR values remaining after the sorting process.

4. The method of claim 3 further comprising implementing the ingress process to include a probability process, the probability process generating the threshold by applying a false-alarm value to the average SNR values.

5. The method of claim 1 further comprising:
   generating a list sufficient to categorize each of the plurality of subcarriers as one of interfered and non-interfered; and
   applying a persistence process to the list, the persistence process removing from the list each subcarrier identified in the list as being interfered when a selected quantity of subcarriers on both sides of the corresponding subcarrier fail to be listed as interfered.

6. The method of claim 5 further comprising:
   implementing a distance process relative to the interfered subcarriers, the distance process determining a suitable distance for a source of at least a portion of the ingress to be positioned to avoid degrading the communication network; and
   determining the suitable distance as a function of the SNR values that are greater than an average power for the plurality of subcarriers minus a required SNR for desired modulation.

7. The method of claim 6 further comprising limiting the SNR values when determining the suitable distance to the SNR values associated with a 90th percentile of the SNR values.

8. The method of claim 7 further comprising generating the SNR values when determining the suitable distance by normalizing the SNR values relative to the average power.

9. The method of claim 1 further comprising determining each of the plurality of subcarriers to be one of interfered and non-interfered depending on whether the SNR values associated therewith exceeds the threshold.

10. A method for assessing ingress in a communication network comprising:
    collecting data from one or more devices operating in the communication network;
    processing the data to determine a threshold for assessing ingress of radio frequency (RF) signaling within the communication network;
    determining the ingress to be interfering with one or more subcarriers used within the communication network when the data associated therewith exceeds the threshold;
    wherein the communication network is a cable network and the devices are cable modems; and
    wherein the ingress results from wireless signaling originating from outside of the cable network.

11. The method of claim 10 determining the threshold based on a probability process, the probability process generating the threshold by applying a false-alarm value to the data.

12. The assessment tool of claim 11 further comprising applying a persistence process to a list, the list being sufficient to categorize each of the plurality of subcarriers as one of interfered and non-interfered, the persistence process removing from the list each subcarrier identified in the list as being interfered when a selected quantity of subcarriers on both sides of the corresponding subcarrier fail to be listed as interfered.

13. A method for assessing ingress in a communication network comprising:
    collecting data from one or more devices operating in the communication network;
    processing the data to determine a threshold for assessing ingress of radio frequency (RF) signaling within the communication network;
    determining the ingress to be interfering with one or more subcarriers used within the communication network when the data associated therewith exceeds the threshold;

implementing a distance process, the distance process determining based on the data a suitable distance for a source of the RF signaling to be positioned to avoid degrading the communication network; and determining the suitable distance as a function of signal-to-noise ratio (SNR) values included as part of the data that are greater than an average power for the plurality of subcarriers minus a required SNR for desired modulation.

14. The method of claim 13 further comprising limiting the SNR values when determining the suitable distance to the SNR values associated with a 90th percentile of the SNR values and/or generating the SNR values when determining the suitable distance by normalizing the SNR values relative to the average power.

15. The method of claim 13 wherein the communication network is a cable network and the devices are cable modems and wherein the ingress results from wireless signaling originating from outside of the cable network.

16. A method for assessing ingress in a communication network comprising:

collecting signal-to-noise ratio (SNR) values for a plurality of subcarriers in use over the communication network; and processing the SNR values to self-identify a threshold for assessing interference from a source of radio frequency (RF) signaling external to the communication network;

determining each of the plurality of subcarriers to be one of interfered and non-interfered depending on whether the SNR values associated therewith exceeds the threshold; and determining a placement of the source sufficient to render each subcarrier determined to be interfered as non-interfered, the placement changing a location of the source from at least a first position to a second position, the first position corresponding with positioning of the source when collecting the SNR values and the second position corresponding with positioning of the source when sufficient to render each subcarrier as non-interfered.

17. A method for assessing ingress in a communication network, the ingress resulting from signaling originating outside of the communication network interfering with signaling in use over the communication network, the method comprising:

collecting signal-to-noise ratio (SNR) values for a plurality of subcarriers in use over the communication network;

implementing a threshold process to generate a threshold for assessing interference, the threshold being generated as a function of processing the SNR values according to the threshold process; and wherein the signaling in use over the communication network is transported through a bounded medium such that the ingress results from the signaling originating outside of the bounded medium overlapping with the signaling in use over the bounded medium.

* * * * *